United States Patent [19]

Dole

[11] Patent Number: 5,498,042
[45] Date of Patent: Mar. 12, 1996

[54] QUICK CONNECT CONNECTOR FOR GROOVED PIPE

[75] Inventor: Douglas R. Dole, Whitehouse Station, N.J.

[73] Assignee: Victauli Company of America, Easton, Pa.

[21] Appl. No.: 262,583

[22] Filed: Jun. 20, 1994

[51] Int. Cl.$^6$ .................................................. F16L 25/00
[52] U.S. Cl. .......................... 285/177; 285/305; 285/321; 285/369; 285/383; 285/906; 285/921
[58] Field of Search ........................ 285/321, 305, 285/921, 906, 177, 369, 363; 24/20 S, 20 TT

[56] References Cited

U.S. PATENT DOCUMENTS

| | | | |
|---|---|---|---|
| 2,877,732 | 3/1959 | Eaton | 285/321 X |
| 2,937,891 | 5/1960 | Gressel | 295/177 |
| 3,144,262 | 8/1964 | Reynolds | 285/321 X |
| 3,177,019 | 4/1965 | Osweiler | 285/321 X |
| 3,540,224 | 11/1970 | Pogonowski | 285/321 X |
| 3,920,270 | 11/1975 | Bobb | 285/177 X |
| 4,183,120 | 1/1980 | Thorne | 285/20 TT X |
| 4,543,691 | 10/1985 | Calmettes | 24/20 TT X |
| 5,004,274 | 4/1991 | Baas | 285/321 X |
| 5,158,407 | 10/1992 | Zettle | 285/321 X |
| 5,414,905 | 5/1995 | Kimura et al. | 24/205 |

*Primary Examiner*—Dave W. Arola
*Attorney, Agent, or Firm*—Abelman, Frayne & Schwab

[57] ABSTRACT

The quick connector for joining pipes having grooved ends has a circlip which normally is of a diameter greater than that of the associated pipe, and which is contracted and locked in the contracted condition, the inner diameter of the circlip at that time being less than the diameter of the pipe, and the outer diameter of the circlip at that time being greater than the diameter of the bore of the connector, the circlip when in a contracted position, locking the connector against removal from the pipe.

9 Claims, 7 Drawing Sheets

QUICK CONNECT CONNECTOR FOR GROOVED PIPE

FIELD OF THE INVENTION

This invention relates to a connector for grooved pipe, which can be installed and secured in a minimum of time, with a minimum of effort, and, by a workman having minimal skill.

Grooved pipe is well-known in the art, and is comprised of a length of metal or plastics pipe which has been cut or roll grooved in its outer circumference at a position adjacent an end of the pipe, to provide an annular groove extending circumferentially of the pipe.

The connector of the present invention finds utility in the full pressure joining of two lengths of grooved pipe in end-to-end relation, or, in connecting a grooved pipe to a fitting or fixture that also has been appropriately grooved for it to simulate an end of a grooved pipe.

The connector itself can be an axially straight connector for connecting two lengths of grooved pipe in end-to-end relation, or, it can be in the form of an elbow for connecting two lengths of grooved pipe in end-to-end right angle relation, or, it can be in the form of a T or cross adapted to connect multiple lengths of grooved pipe to a supply main of grooved pipe, or, it can be in the form of an adapter for receiving a sprinkler head, tap, pressure gauge, or other fitting.

While in its simplest form, the connector is in the form of a tube of substantially constant diameter throughout its length, the connector can be appropriately configured for it to connect a grooved pipe of one diameter to one or more grooved pipes of a different diameter.

The connector of the present invention finds particular utility in the quick assembly of water supply lines for non-permanent municipal, armed forces, refugee and other camp grounds, for use in field hospitals, field kitchens, showers, and the like, in which the supply lines must be assembled with minimum time and effort, and, similarly disassembled with minimum time and effort for transportation and re-assembly at a different site.

The connector of the present invention also finds particular utility in the quick assembly of water supply lines in mining operations, and in particular coal mines, in which the terrain to be traversed progressively is changed as the mining operation proceeds. Also, in such operations, it is required that the pipe lines must accommodate themselves to uneven terrain, slopes and angles and bends, that occur randomly as the mining corridors are developed.

The quick connector also evidences utility in the assembly of horticultural irrigation systems, that will be disassembled after a growing season to permit preparation of the ground for a subsequent growing season.

Such horticultural irrigation systems commonly are comprised of a main supply pipe line which is connected to secondary distribution pipe lines, the distribution pipe lines being employed to feed spray nozzles and the like, or, perforate drip irrigation lines.

BACKGROUND OF THE INVENTION

Quick connectors for pipe lines are well-known in the art, and, commonly are employed for connecting lengths of horticultural flexible plastic hose to one another.

Additionally, numerous devices have been prior proposed that are received in clamping engagement with the ends of un-grooved or plain-ended pipe, such devices commonly employing band clamps which are employed to compress a sleeve of a resilient material, such as rubber, into frictional gripping and sealing relation with the outer surface of plain-ended pipe.

Such installations are, relatively weak and insubstantial, in that they rely exclusively on the frictional gripping of the pipes by the connecting sleeve, and, are subject to separation and water loss in the event that one of the pipes is angled relative to the other, or, is subjected to a tensile stress. Typical of such clamp-type connectors are disclosed in U.S. Pat. Nos. 3,586,354 to Boscacci, and 5,193,859 to McKinnon.

More substantial types of connectors are disclosed in U.S. Pat. Nos. 2,980,143 to Harris, 4,146,252 to Bunda and 4,630,647 to Thompson, each of which is cumbersome and laborious to assemble, and each of which requires a wrench or other tool for its assembly.

SUMMARY OF THE INVENTION

It is an object of this invention to provide a connector for grooved pipe that will facilitate the quick assembly of pipe lines employing grooved pipe, with extreme rapidity, and in the absence of tools, and, which will provide a pipe line assembly having substantial strength and resistance against axial, lateral, or bending stressing of the pipes, thus to provide a predictably stable and leak-proof pipe line assembly, which, when required, can be disassembled with equal speed and facility, again, in the absence of tools.

These advantages are accomplished by providing a connector in the form of a hollow cylinder that is sized for it to be slid easily over the end of a grooved pipe, the connector providing a housing for an O-ring for sealing engagement with the outer surface of the grooved pipe. Preferably, the O-ring is positioned within the connector at a location in which it is not required to pass over the cut or rolled groove in the pipe, thereby minimizing the chances of cutting or abrasion of the O-ring during the assembly of the coupling onto the pipe.

Preferably, the coupling includes an internal abutment for engagement with the end of a grooved pipe, in order that the connector can be quickly positioned over the grooved pipe in a required positional relationship relative to the grooved pipe, by merely stabbing the coupling onto the pipe end, or conversely, stabbing the pipe end into the coupling.

Interiorly of the coupling, there is provided an annular groove, which opens circumferentially into an access port which extends radially through the coupling, and which is open at the radially outer side of the coupling.

Positioned within the groove is a circlip, which can be manually contracted and locked in a condition in which the diameter of its inner periphery is less than the outer diameter of the pipe, and its outer periphery is of a diameter greater than the outer diameter of the pipe, and also greater than the inner diameter of the coupling, thus to provide a positive abutment for the side walls of the groove in the pipe, and also the side walls of the annular groove in the coupling member, thus to preclude unrestrained relative axial movement between the pipe and the coupling member.

When it is desired to disassemble the pipe line, the locking device of the circlip is manually released, this permitting the circlip to expand to a larger diameter in which the circlip is contained entirely within the groove in the coupling member, the inner diameter of the circlip having been expanded to a diameter greater than the outer diameter of the pipe and greater than the inner diameter of the coupling, in this way removing the circlip in its entirety in its capacity of providing an abutment for the side wall of the groove in the pipe, and, permitting easy removal of the coupling from the pipe, or vice versa.

The grooved pipe can be cut-grooved metal or plastics pipe, or, it can be roll-grooved plastics pipe or thin-walled metal pipe. The coupling member can be formed of any suitable material including metals and plastics materials that are of sufficient rigidity to resist bending of the coupling member out of axial linearity. The circlip conveniently is formed from a hard but resilient plastics material, but also, if desired, could be fabricated from a suitable metal.

DESCRIPTION OF THE DRAWINGS

Preferred embodiments of the invention will now be described with reference to the accompanying drawings, in which.

DESCRIPTION OF THE PREFERRED EMBODIMENTS

Figure 1:
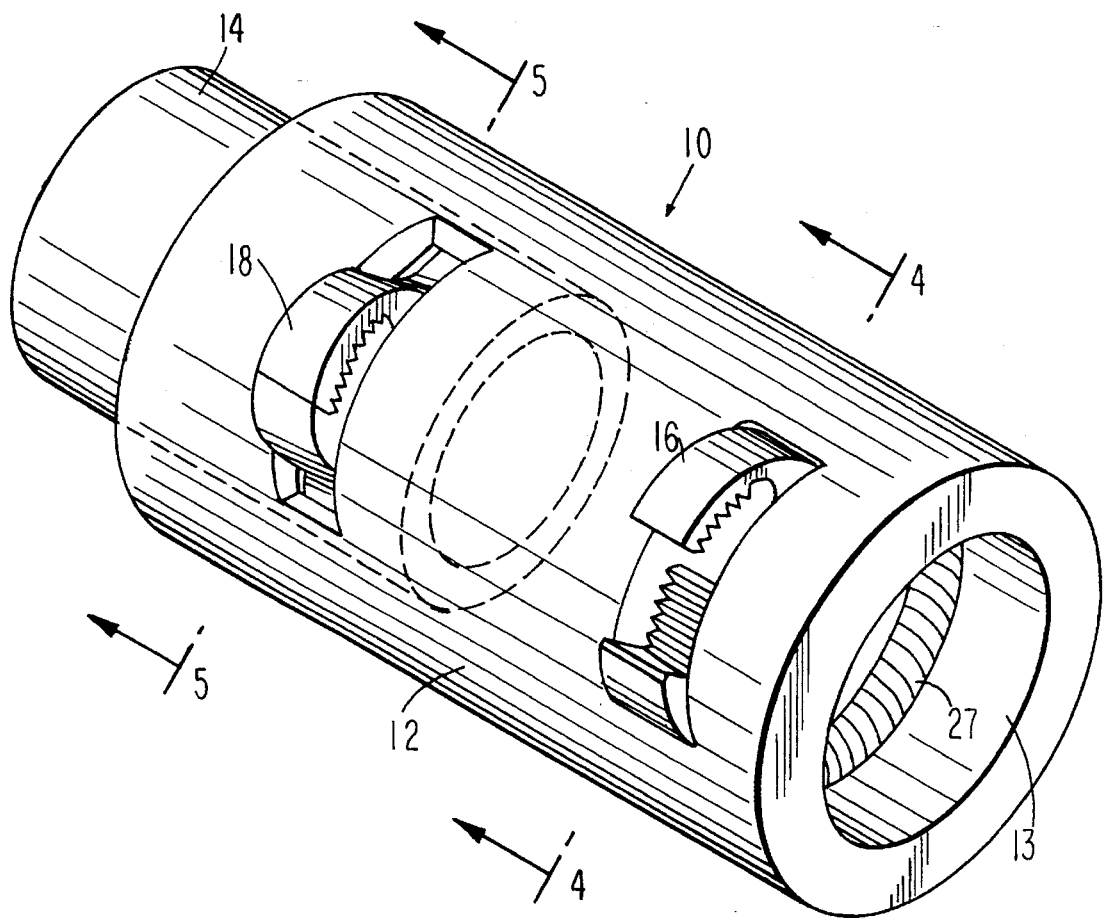
FIG. 1 is a perspective view of a basic form of connector to be employed in joining two lengths of grooved pipe to each other in axial alignment.

FIG. 1 illustrates a basic form of connector according to the present invention, which is specifically intended to connect the axially aligned ends of two grooved pipes.

The connector, which is indicated generally at 10, comprises a cylindrical body 12 having a central bore 13, for the reception of the pipe ends, one of which is shown at 14.

Located within the body 12, as later fully described, are two circlips 16 and 18, the circlip 16 being shown in an open position in readiness for the reception of a pipe end, the circlip 18 being shown in a closed and secured position in which it is operative to prohibit removal of the connector 10 from the pipe 14, or, in the alternative, removal of the pipe 14 from the connector 10.

Figure 2:
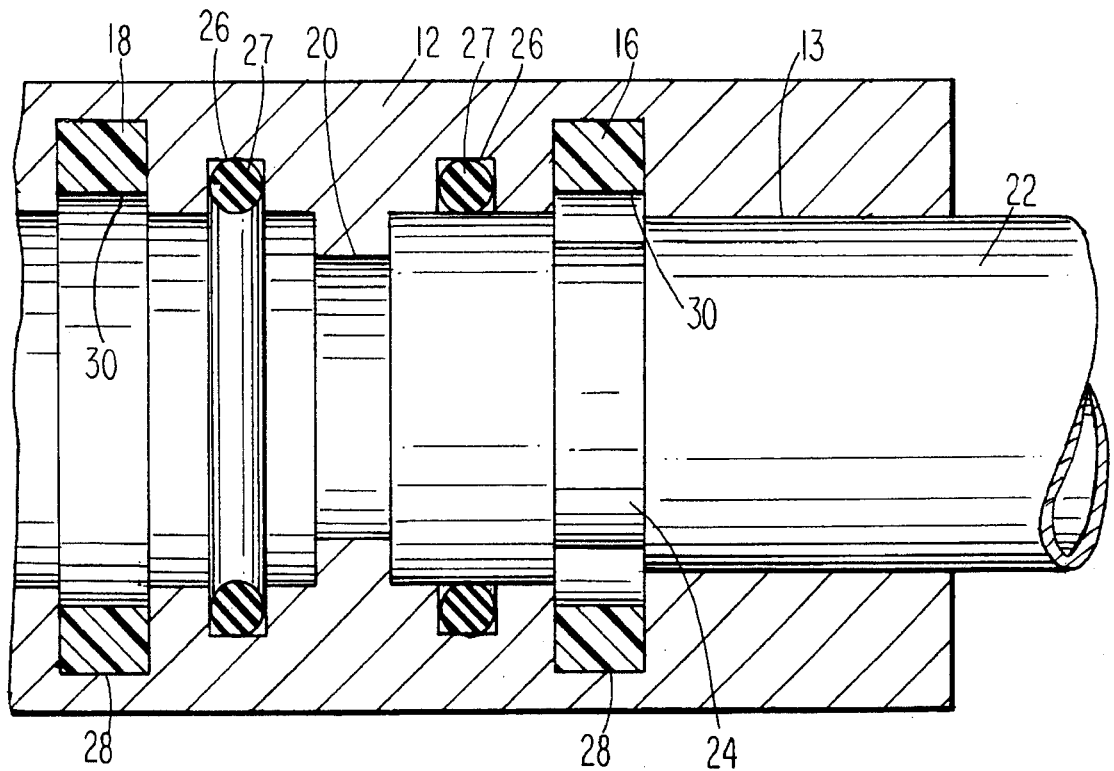
FIG. 2 is a longitudinal cross-section through the connector showing the connector in an unlocked condition.
Figure 3:
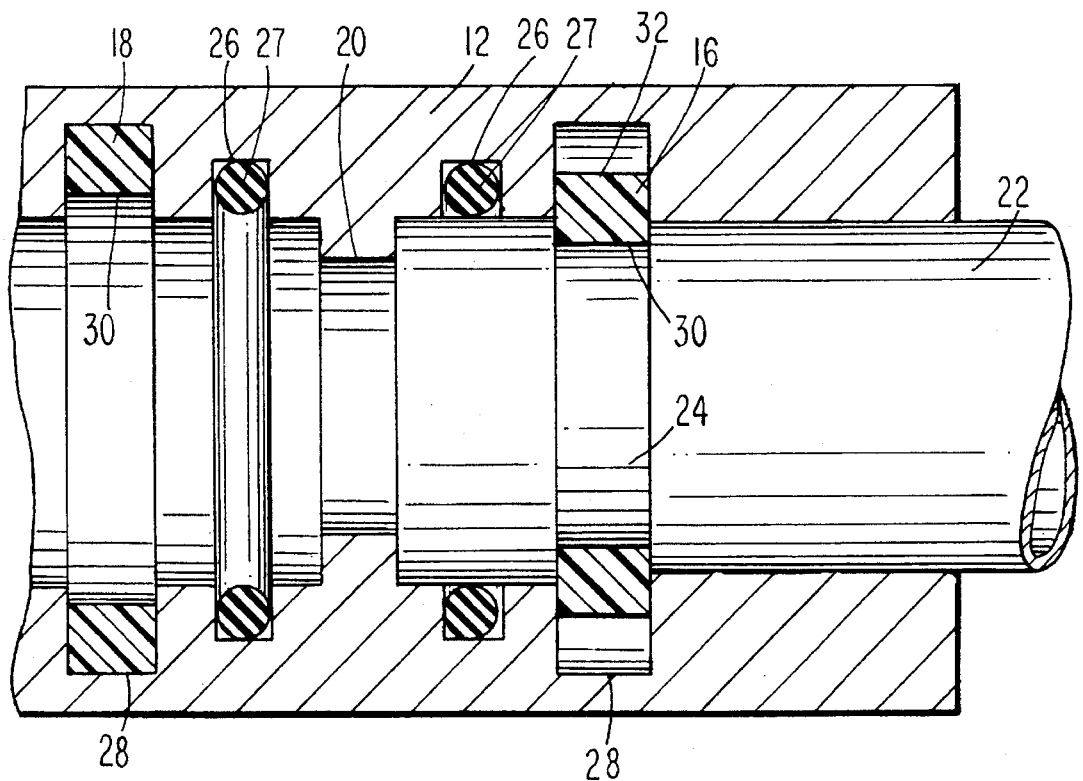
FIG. 3 is a longitudinal cross-section through the connector similar to that shown in FIG. 2, but showing the connector in locked condition.

Referring now to FIGS. 2 and 3, the cylindrical body 12 is provided with a central abutment 20, which is provided to limit the extent to which a grooved pipe 22 can be inserted into the central bore 13 of the body, in this way accurately positioning the groove 24 in the pipe periphery in correct relation to the circlip either 16 or 18.

Positioned adjacent the central abutment 20 in annular grooves 26 formed in the body 12 in surrounding relation with the bore 13 are O-rings 27, for sealing engagement with a pipe end when appropriately inserted into the bore 13.

When properly inserted into the body 12, the groove 24 of the grooved pipe 22 becomes correctly aligned with annular grooves 28 formed in the body 12, and which interconnect with the bore 13, the annular grooves 28 containing the respective circlips 16 and 18.

In FIG. 2, both of the circlips 16 and 18 are shown in an expanded condition in which an inner periphery 30 of the respective circlips 16 and 18 are of a diameter at least equal to, and preferably slightly greater than the diameter of the pipe 22. In this condition, the pipe 22 can be stabbed into the body 12, or in the alternative, the body 12 can be stabbed onto the pipe 22, to bring the free end of the pipe 22 into contact with the abutment 20.

As is later described with reference to FIGS. 4 and 5, the circlip 16 is then contracted in diameter as shown in FIG. 3 for its inner diameter 30 to become less than the outer diameter of the pipe 22, the outer periphery 32 of the circlip 16 being of a diameter greater than the outer diameter of the pipe 22. In this condition, and as shown in FIG. 3, the circlip 16 provides a positive abutment for the side walls of the groove 24 of the pipe 22, and also provides positive abutments for the side walls of the annular groove 28.

The pipe 22 is in this manner locked against axial movement relative to the body 12, the O-ring 27 providing a liquid-tight seal between the end of the pipe 22 and the body 12.

A second pipe (not shown) can then be stabbed into the opposite end of the connector in an identical manner to the pipe 22, subsequent to which the circlip 18 is contracted in an identical manner to the circlip 16 for it to secure that pipe within the body in an identical manner to that described with reference to the pipe 22.

At that point, the two pipes become locked within the body 12 in axial alignment with each other, leakage being prevented by the respective O-rings 27.

Figure 4:
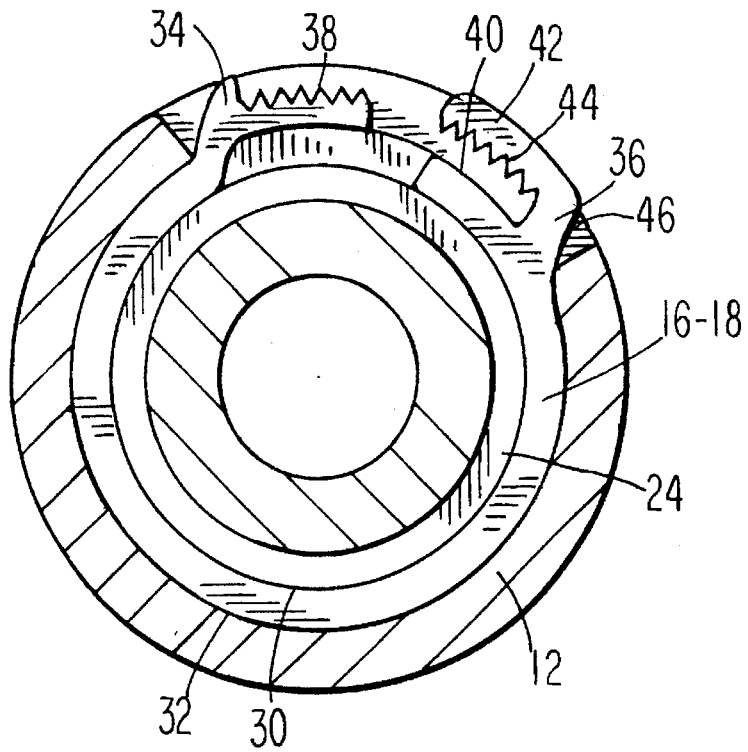
FIG. 4 is a transverse cross-section taken on the line IV—IV in FIG. 1, and showing the connector in an unlocked condition.

Referring now to FIG. 4, which illustrates the circlip 16 or 18 when in an initial position prior to contraction of the circlips, the respective circlips each are of C-shaped configuration, one end of the circlip being provided with a locking member 34, the opposite end of the circlip being provided with a complementary locking member 36.

The locking member 34 is arcuate in form and is provided with serrated teeth 38 on its outer surface. The complementary locking member 36 is provided with arcuate extensions 40 and 42, the arcuate extension 42 being provided with serrated teeth 44 on its inner arcuate surface.

Figure 5:
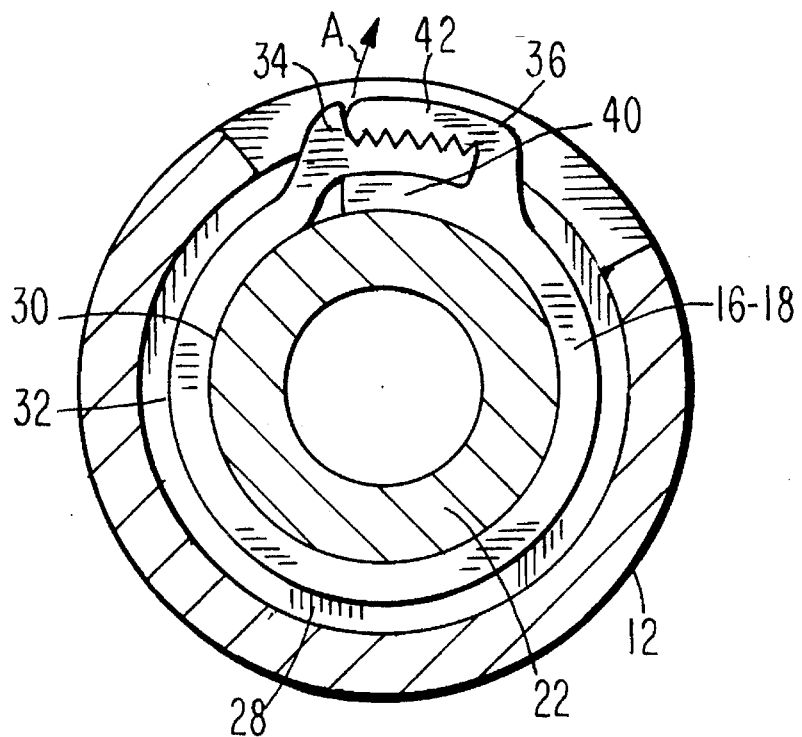
FIG. 5 is a transverse cross-section taken along the line V—V in FIG. 1, and showing the connector in a locked condition.
Figure 6:
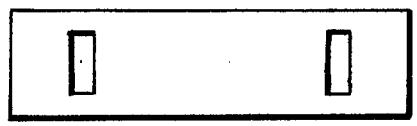
FIGS. 6 through 11 illustrate diagrammatically various configurations that the connector may provide in order to meet varying requirements in a water system.

The respective locking members 34 and 36 extend radially outwardly of an access port 46 that interconnects with an associated annular groove 28, such that the locking members 34 and 36 can be gripped exteriorly of the body 12, and then, be moved towards each other and interlocked with each other as illustrated in FIG. 5.

When moved towards each other to the position shown in FIG. 5, the locking member 34 enters the arcuate extensions 40 and 42 of the locking member 36 for the locking member 34 to be entrapped within and securely held by the arcuate extensions 40 and 42 of the locking member 36, movement of the arcuate extension 42 being permitted by resilience of the circlip 16 or 18, the circlips being formed from a relatively hard but resilient plastics material, or of a spring metal material.

During that movement the circlip becomes contracted in diameter, such that the inner periphery of the circlip, which initially was of a diameter greater than that of the pipe 22 becomes of lesser diameter than the pipe 22, and is moved radially inwardly of the groove 24 from the position shown in FIG. 4 to the position shown in FIG. 5.

The outer diameter of the circlips similarly decreases, the radial width of the respective circlips being such that in the contracted position shown in FIG. 5, the outer diameter 32 of the circlip remains entrapped within the annular groove 28, the diameter of the outer periphery of the circlip in that condition being greater than the diameter of the pipe 22.

If it is desired to release the circlip from the condition shown in FIG. 5 to that shown in FIG. 4, in order to permit disassembly of the pipe line, all that is necessary is for the arcuate extension 42 to be moved radially outwardly in the direction of the arrow A in FIG. 5, at which time the serrated teeth of the respective locking members 34 and 36 become disengaged, this allowing the circlip 16 or 18 then to spring back to its original condition as illustrated in FIG. 4, this releasing the interconnection between the body 12 and the pipe 22, and permitting disassembly of the piping system (not pipe line).

As can be expected, a piping system can be assembled with extreme rapidity by use of the connector of the present invention, it merely being necessary to stab the pipes into the connector, and then engage the locking members of the circlips. With equal facility, the piping system can be disassembled merely by releasing the locking members of the circlips, and then withdrawing the pipes from the connector, this resulting in a very considerable saving in time, as compared with conventional piping systems, and also, being of greatly increased saving in manual labor, in that it can be accomplished by an unskilled workman.

The pipes 22 can be cut-grooved metal or plastics pipe or roll-grooved metal or plastics pipe, or roll-grooved thin wall metal pipe. The pipes 22 preferably are cut grooved or roll-grooved pipes of plastics material, such as are well-known in the art, this resulting in a very considerable weight saving, and further enhancing the ease of assembly of the piping system.

The body 12 of the connector 10 similarly can be formed from metal, but, for the same reason, preferably is formed form plastics material, the respective circlips 16 and 18 preferably being formed from a hard but resilient plastics material. If desired, the circlips can be formed from a suitable metal having the required resilient spring characteristic.

Figure 7:
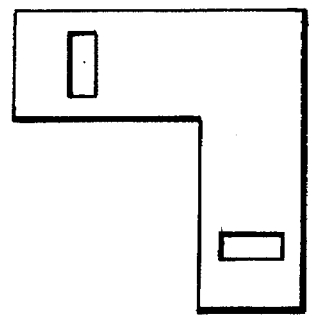
Figure 8:
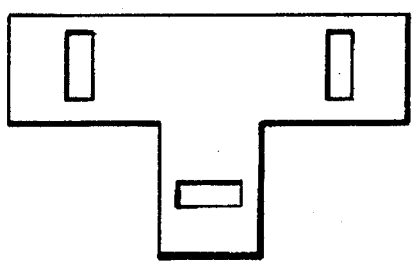
Figure 9:
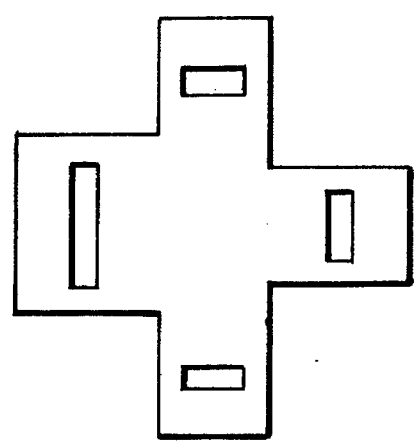
Figure 10:
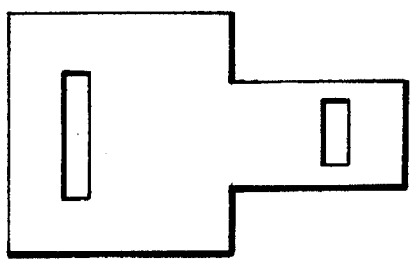
Figure 11:
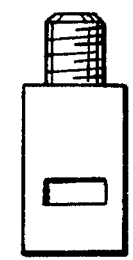

While a straight line connector so far has been described, as will be apparent from FIGS. 6–11, the connector can take a multitude of forms. For example, the basic in-line connector of FIG. 6 can be provided as an elbow, as illustrated in FIG. 7, or as a T, as illustrated in FIG. 8, or, as a cross, as illustrated in FIG. 9, FIG. 9 also illustrating the option of one arm of the connector being formed to accommodate a pipe of larger diameter than the pipes accommodated by the other arms of the connector. Similarly, as illustrated in FIG. 10, the connector can provide a step-down between a pipe of large diameter and a pipe of smaller diameter. As illustrated in FIG. 11, the connector can provide the termination of a pipe line, which conveniently can have a tap, shower head-sprinkler head, or similar device attached thereto, thus facilitating the construction of washing facilities, showers, sprinklers, and the like in any desired lay-out and configuration.

Figure 12:
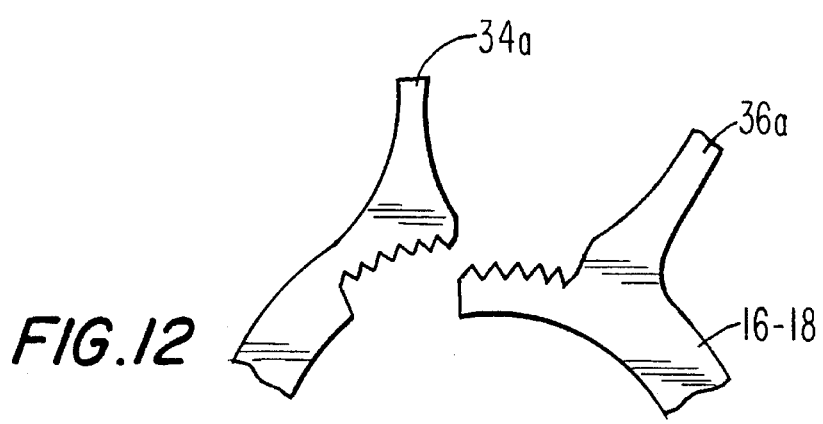
FIGS. 12, 13 and 14 illustrate alternative locking mechanisms for the connector; and, FIGS. 15 through 18 illustrate alternative forms of a circlip employed in the connector.
Figure 13:
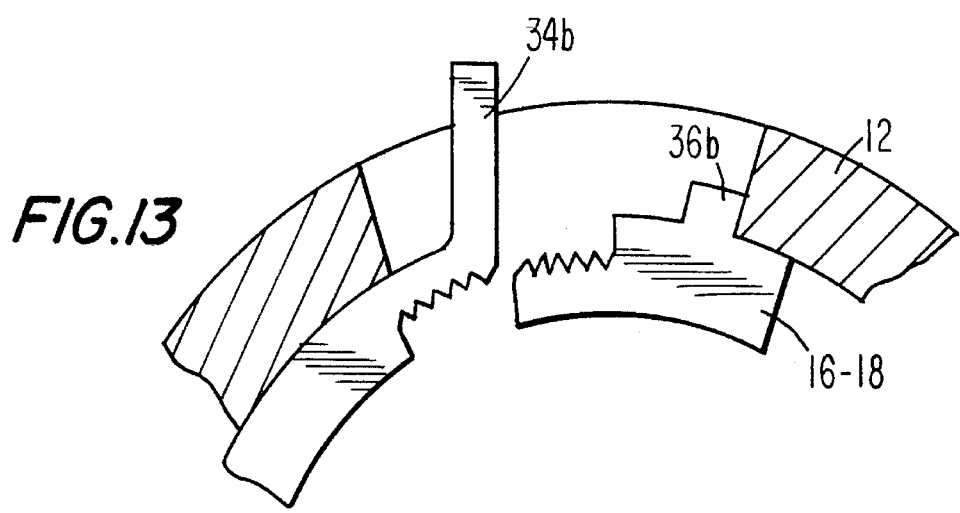
Figure 14:
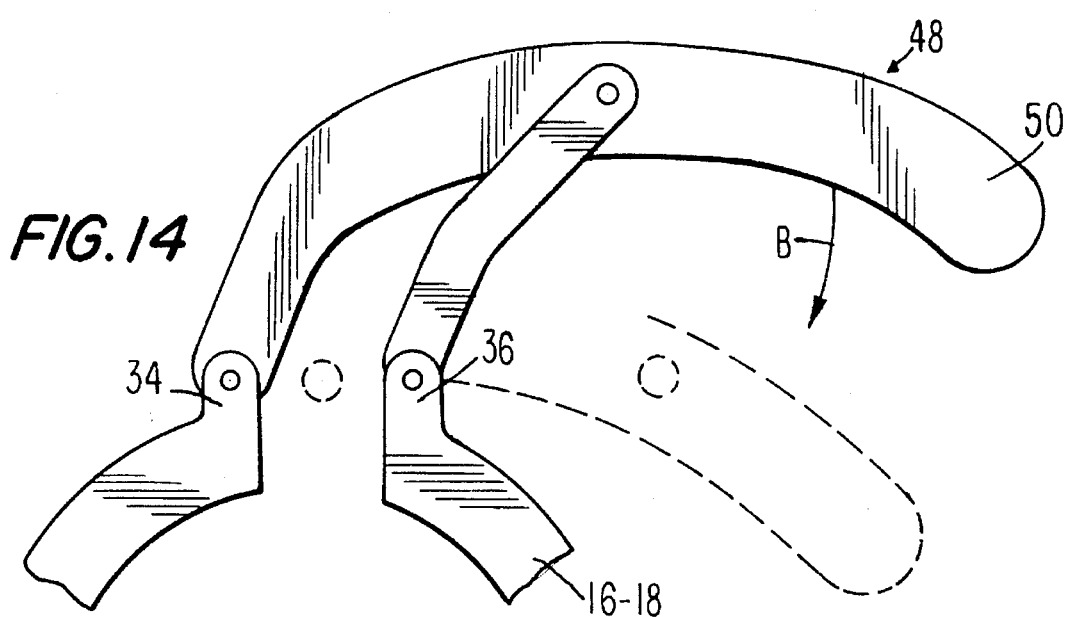

As further will be apparent, and as is illustrated in FIGS. 12 through 14, the locking members 34 and 36 for the circlips 16 and 18 can take other forms, for example, and as is illustrated in FIG. 12, the locking members 34 and 36 can be provided with radially extending finger grips facilitating the closing and opening of the locking members. Alternatively, and as illustrated in FIG. 13, the locking member 36 can comprise a simple abutment, which engages with the body 12 to prevent rotation of the circlip within the body 12, and a single finger engageable tab 34 be provided at the opposite end of the circlip.

Alternatively, and as is diagrammatically illustrated in FIG. 14, the respective ends 34 and 36 of the circlip can be pivotally connected to an overset toggle linkage 48 that is operative to move the ends 34 and 36 of the circlips towards each other on depression of a handle 50 of the toggle linkage in the direction of the arrow B.

FIGS. 15 through 18 illustrate various alternative forms of the circlips 16 and 18.

Figure 15:
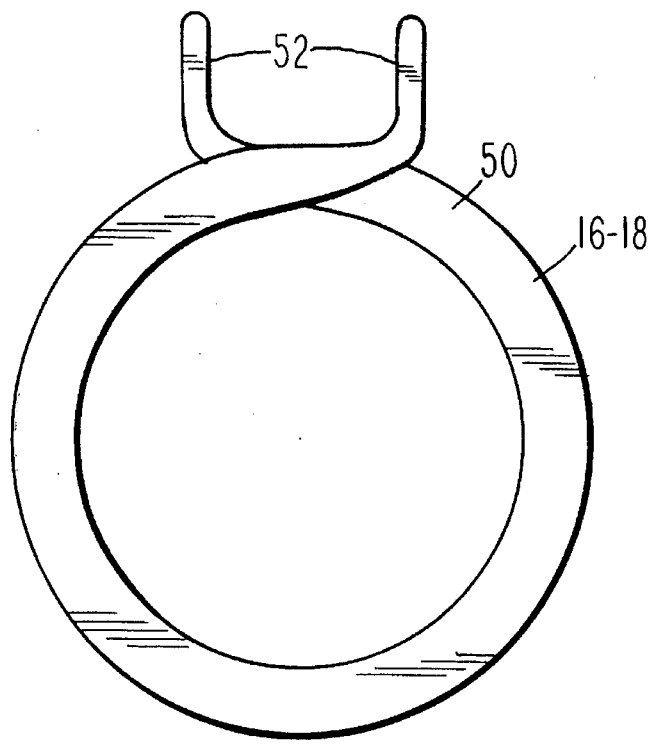

In FIG. 15, the ends of the circlip are recessed at 50 so that they interfit and can slide relative to each other, the ends of the circlip being provided with ears 52 that can be moved towards each other to increase the internal diameter of the circlip. In this instance, the circlip is expanded in order to permit entry of a pipe into the bore 13 of the coupling member.

Figure 16:
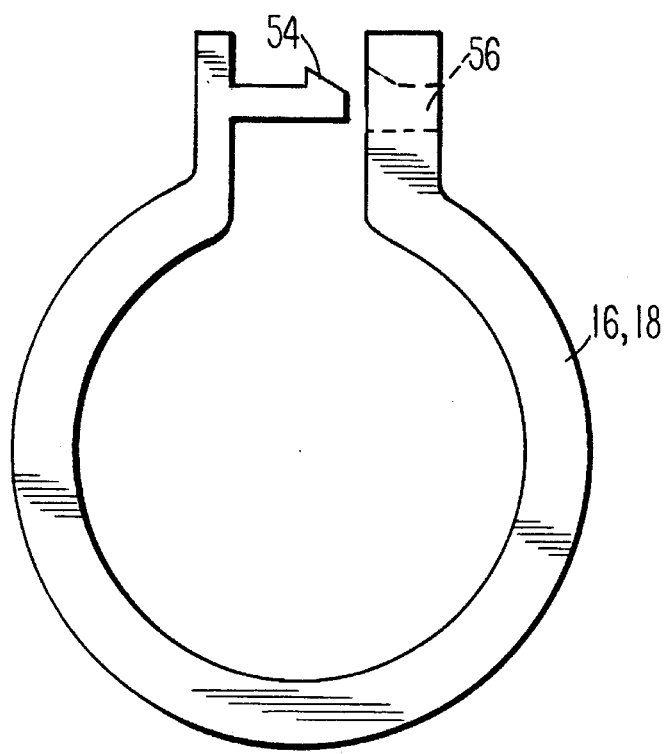

FIG. 16 employs a latch 54 that is received in a latching socket 56 in order to lock the circlip 16, 18 in a contracted condition.

Figure 17:
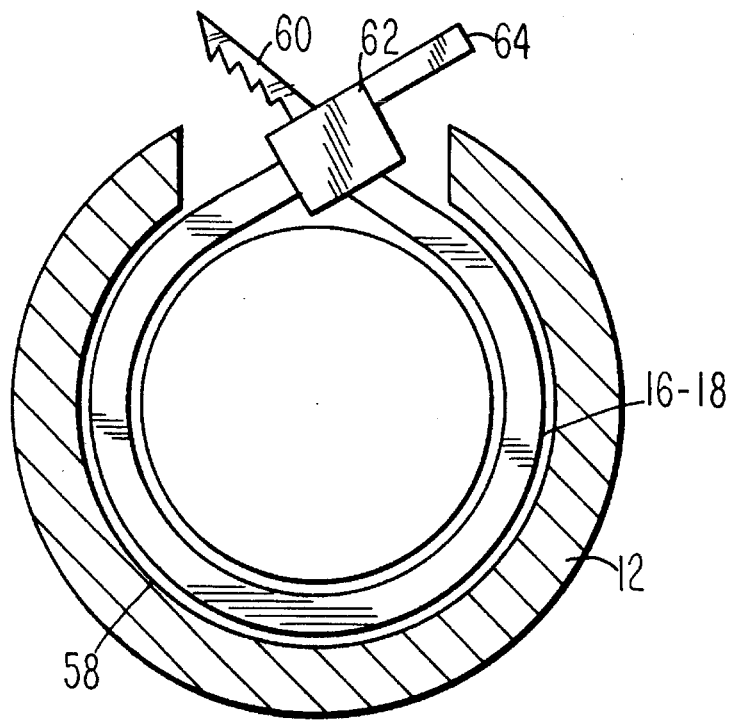

FIG. 17 illustrates a circlip 58 having a male end 60 provided with serrations, which is received within a female end socket 62, in a manner which is well-known in the art, a tab 64 being provided for raising the female member 62 to permit release of the male end 60.

Figure 18:
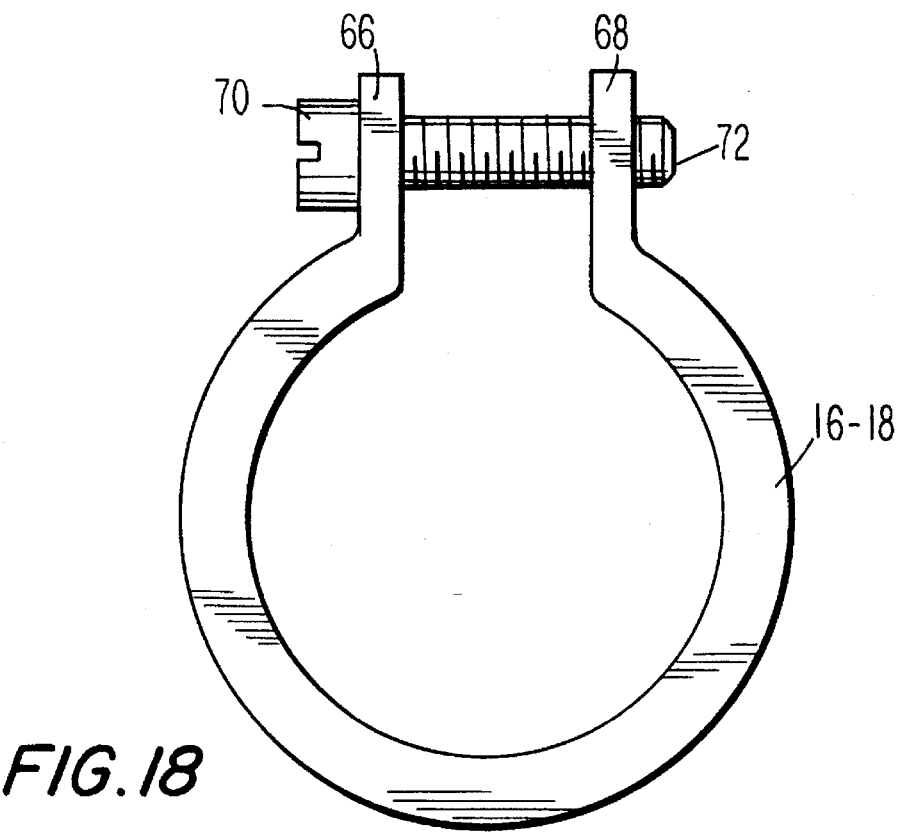

FIG. 18 illustrates an embodiment of the circlip 16 or 18, in which the ends of the circlip are provided with ears 66, one of which is bored to accommodate the shaft of a bolt 70, the other of which is appropriately bored and threaded to receive the threaded shank 72 of the bolt 70.

While not as desirable, in that the use of a tool will be required in contracting or expanding the circlips, various other structures can be employed using screws or bolts, in which event the circlips preferably will be made of a spring metal material, the major consideration being that the circlip can be contracted from a first position in which its inner diameter is greater than that of the pipe to be entrapped, to a second position in which the inner periphery of the circlip is of the diameter less than that of the pipe to be entrapped, while at the same time, the outer periphery of the circlip remains entrapped within the body of the connector.

What is claimed is:

1. A quick connector for a circular pipe of a constant single outer diameter having a circumferential groove in an outer surface of said pipe, positioned adjacent an axial end of said pipe and spaced from said axial end, said connector including:

a body having a circular bore, said body having an axial length sufficient to engage said pipe on opposite sides of said groove in said pipe, said bore having a diameter slightly exceeding that of said outer diameter of said pipe;

a first annular groove in said body encircling said bore and communicating directly with said bore at a position aligned with a said groove of a said grooved pipe when said grooved pipe is inserted into said bore of said body;

an abutment within said bore for limiting the extent of axial insertion of said pipe into said bore and for axially aligning said groove in said pipe exterior with said first groove in said bore:

a circlip positioned within said first annular groove in said body, said circlip engaging opposite sides of said groove, and having an inner diameter at least equal to the diameter of said bore, and having an outer diameter substantially greater than the diameter of said bore; and means for contracting and locking said circlip to an inner diameter less than said outer diameter of said pipe and an outer diameter greater than said diameter of said bore;

whereby, said circlip provides a stop member prohibiting removal of said pipe from said connector when said circlip is in said contracted and locked condition;

further including a second annular groove in said body encircling said bore at a position aligned with said outer surface of said pipe at a position remote from said circumferential groove in said outer surface; and, an O-ring positioned in said second annular groove and engageable with said pipe outer surface and said second annular groove in sealing engagement therewith when said pipe is inserted into said bore of said body.

2. The quick connector of claim 1, in which said means for contracting and locking said circlip comprises:

said circlip having circumferentially spaced ends;

a locking member fast with one end of said ends;

a complementary locking member fast with the other of said ends;

and means for moving said respective locking members into interlocking relation with each other upon movement of said circlip to said contracted condition.

3. The quick connector of claim 2, in which said respective locking members each include locking teeth for locking engagement with locking teeth of the other of said locking members.

4. The quick connector of claim 2, further including an access port extending through said body and communicating with said annular groove in said body, said access port permitting manipulation of said locking means of said circlip from a position exterior to said body.

5. The quick connector of claim 4, in which said circlip is formed from a hard and resilient material, and one of said locking members is manually displaceable by flexure of the material of said circlip to permit release of said locking members when said circlip in a contracted and locked condition.

6. The quick connector of claim 1, in which said connector has plural said bores, each including a said annular groove and each including a said circlip positioned in each said annular groove, whereby said connector can provide an interconnection between a plurality of said grooved pipes.

7. The connector of claim 6, in which at least one of said bores is of a diameter different from that of another of said bores, whereby said connector can connect pipes of differing external diameters.

8. The quick connector of claim 6, abutment positioned interiorly of said quick connector limits the extent of axial movement of said plurality of said grooved pipes into said connector.

9. The connector of claim 1, in which said grooved pipe end is provided by a fitting.

* * * * *

UNITED STATES PATENT AND TRADEMARK OFFICE
CERTIFICATE OF CORRECTION

PATENT NO. : 5,498,042
DATED : March 12, 1996
INVENTOR(S) : Douglas R. Dole

It is certified that error appears in the above-indentified patent and that said Letters Patent is hereby corrected as shown below:

On the title page, item [73], Assignee should read:
-- Victaulic Company Of America --.

Signed and Sealed this

Fifth Day of November, 1996

Attest:

BRUCE LEHMAN

*Attesting Officer*   *Commissioner of Patents and Trademarks*